Figure 5:
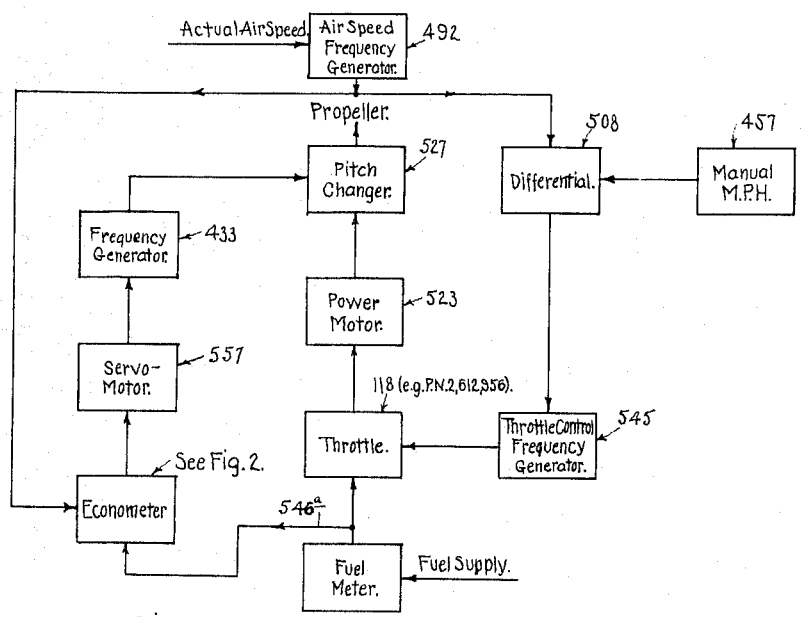

Dec. 7, 1965     T. A. BANNING, JR     3,221,759
INSTRUMENTS FOR CONTROLLING OPERATIONS, TO
ENSURE OPTIMUM OPERATING CONDITIONS
OF SUCH OPERATIONS

Original Filed Jan. 8, 1945     4 Sheets-Sheet 1

Inventor:
Thos. A. Banning, Jr.

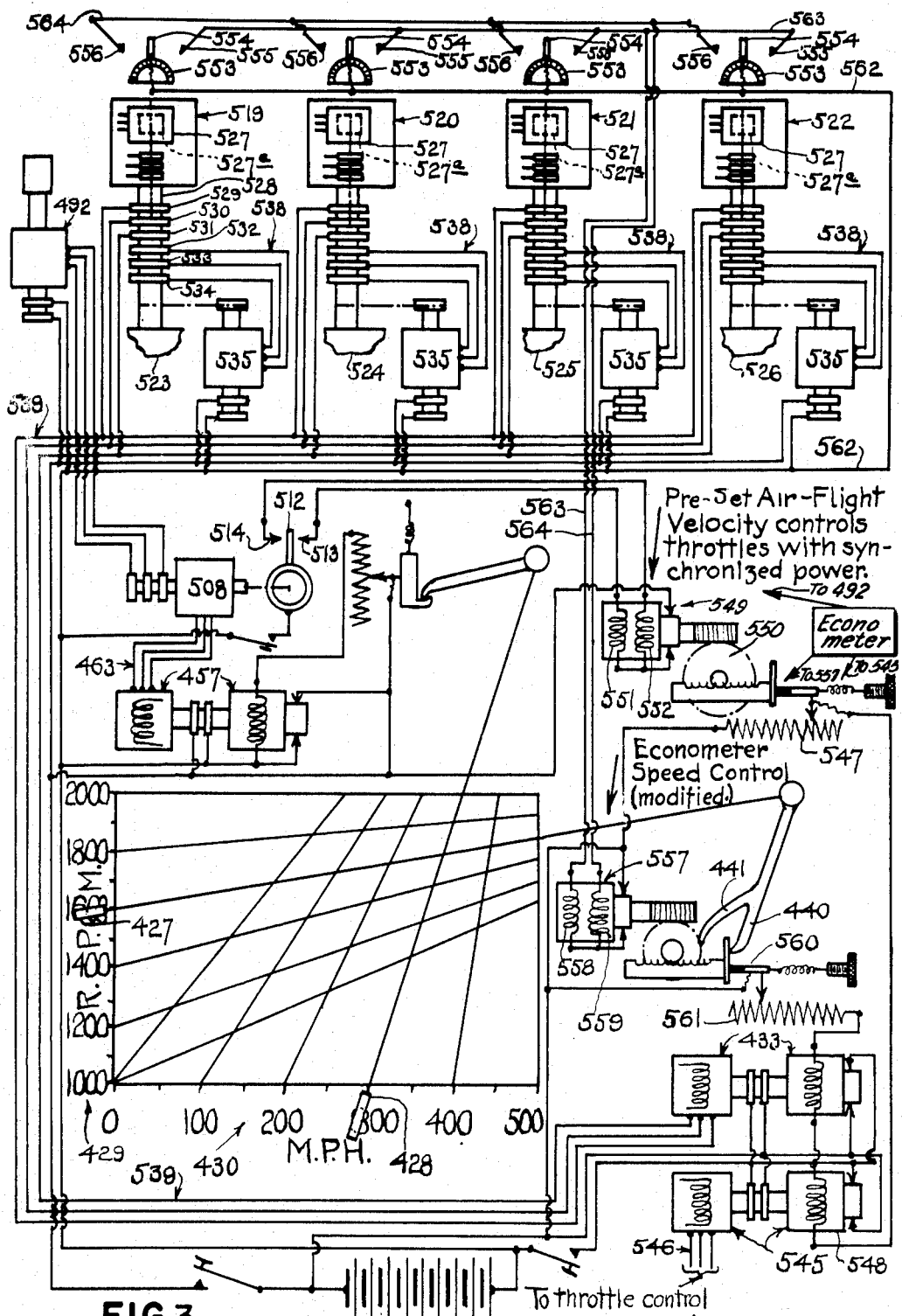

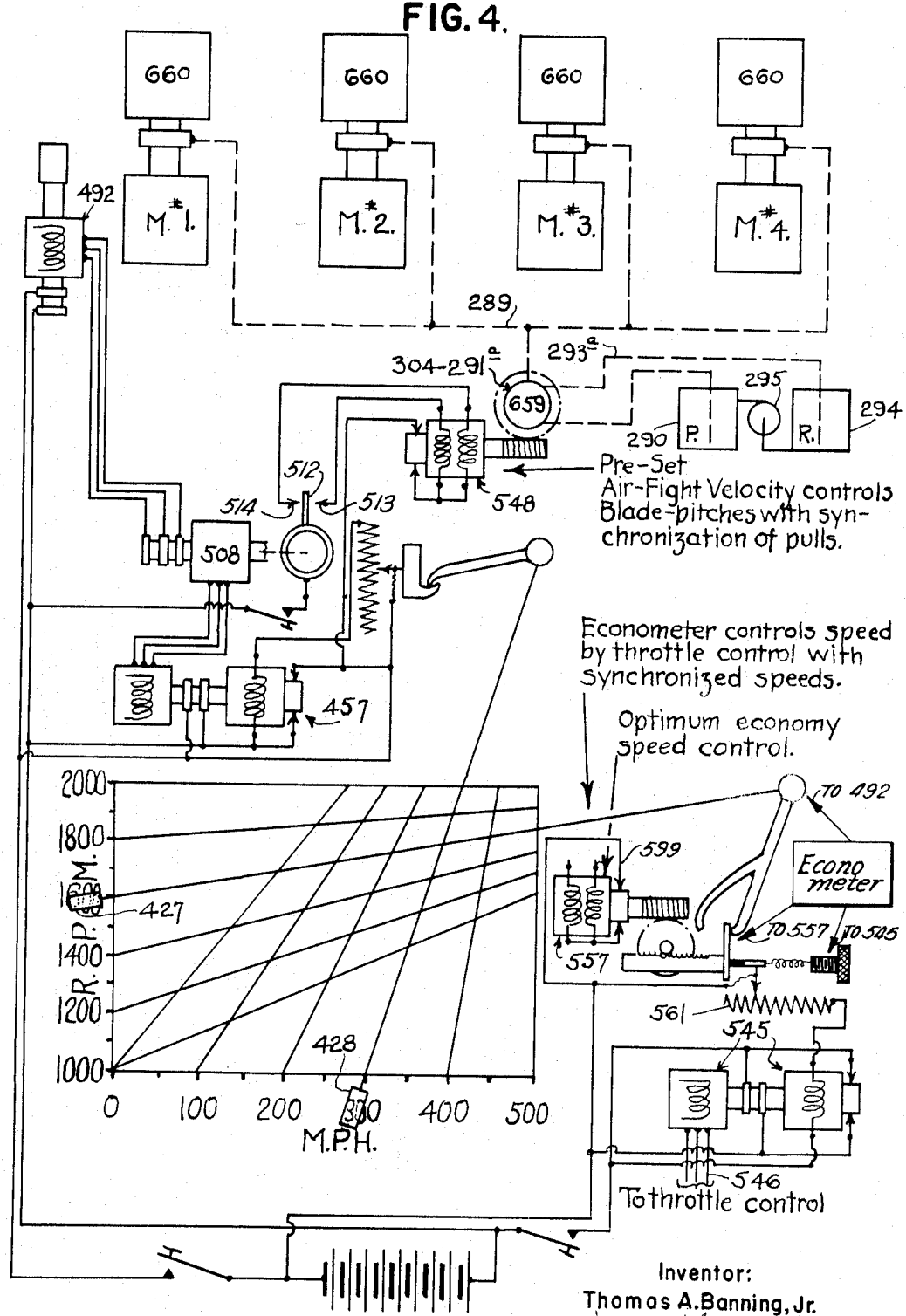

Dec. 7, 1965 T. A. BANNING, JR 3,221,759
INSTRUMENTS FOR CONTROLLING OPERATIONS, TO
ENSURE OPTIMUM OPERATING CONDITIONS
OF SUCH OPERATIONS
Original Filed Jan. 8, 1945 4 Sheets-Sheet 4

Inventor:
Thomas A. Banning, Jr.

United States Patent Office 3,221,759
Patented Dec. 7, 1965

3,221,759
**INSTRUMENTS FOR CONTROLLING OPERA-
TIONS, TO ENSURE OPTIMUM OPERATING
CONDITIONS OF SUCH OPERATIONS**
Thomas A. Banning, Jr., 5500–5520 S. Shore Drive,
Chicago, Ill.
Application May 29, 1957, Ser. No. 662,542, now Patent
No. 3,096,469, dated July 2, 1963, which is a division
of application Ser. No. 248,340, Sept. 26, 1951, now
Patent No. 2,794,507, dated June 4, 1957, which is a
division of application Ser. No. 573,382, Jan. 18,
1945, now Patent No. 2,569,444, dated Oct. 2, 1951.
Divided and this application June 4, 1963, Ser. No.
285,399
10 Claims. (Cl. 137—18)

This application is a division of my co-pending application for Letters Patent on Improvements in Instruments for Controlling Operations to Ensure Optimum Operating Conditons, Serial No. 662,542, filed May 29, 1957, and allowed December 11, 1962, now Letters Patent No. 3,096,469, issued July 2, 1963; which application, Serial No. 662,542, was a division of my application for Improvements in Synchronizing Systems for Plural Propellers with Pitch and Fuel Control, Serial No. 248,340, filed September 26, 1951, now Letters Patent No. 2,794,507, issued June 4, 1957; and which application, Serial No. 248,340, was a division of my earlier application for Improvements in Propeller Pitch Control, Serial No. 573,382, filed January 18, 1945, now Letters Patent No. 2,569,444, issued October 2, 1951.

This invention relates to improvements in instruments for controlling operations to ensure optimum operating conditions of such operations, and the like. The following brief statement will explain certain of the operations which are controlled by instruments embodying my present inventive features, and will also show certain of the complex relationships which are brought into simple operative functions and controls to enable attainment of the optimum operating conditions above referred to.

Frequently industrial and other operations, such as power generating operations, include the inter-relating of two or more operational functions or variables in operations wherein "economy" of the operation is affected by either or both such variables. Under such conditions the overall operation may continue uninterruptedly for the continuous operation, but the economy of such operation will be affected in manner depending on whether such variables are at any given time properly related to each other as affected by the value or speed or other operating characteristics of one or another of such variables. The manner of the effect produced on the overall economy will depend on the relationships of the variables to each other at the time in question. Generally by changing one or the other of the variables with, possibly corresponding change in another variable or variables, the overall economy may be increased without affecting the continuity or perfection of the operation, insofar as the production of the desired "end-effect" is concerned. Or, conversely, by changing such variable or variables in the wrong direction the overall economy of the operation may fall instead of being increased. In such case the direction of change of such variable should of course be reversed so that the corrective effect will be to increase rather than reduce the overall economy.

Usually the economy of an operation may be shown by a curve which brings into relation the economy overall produced by the operation as affected by the change of one of the variables; for example, variation of the pitch of the propeller blades. Such a curve of economy will rise from zero when the blades are set at zero pitch, reaching a maximum or peak economy value for a blade pitch value which will depend on various factors. Then, assuming such factors themselves remain unchanged, such curve will fall again at the pitch is increased beyond such "critical" value of maximum economy or optimum operation, the falling portion of the curve generally being concave upwards over most of its falling portion, and reaching zero again for a pitch of something less than ninety degrees. Such illustration of variation of the economy with variation of one variable is given by way of illustration of one type of operation in which the curve of economy vs. change of a variable is of a form which includes a "peak" value representing maximum economy.

It is here noted that when the two variables (such as propeller speed and economy) are shown, the one along the horizontal axis of the graph, as abscissae, and the other vertically as ordinates, the curve of economy will generally rise to the peak value and then fall, as the speed is increased. Accordingly, the first derivative of such curve will change between positive values and negative values at the peak of the curve since the rate of change of the economy will, at such peak, become zero, and, for speed values in excess of that corresponding to such peak, the rate of change will become negative, corresponding to decreasing economy values.

The "economy" of operation will be designated in terms of a unit which defines the kind of economy whose value is to be determined. Thus, for example, in the case of a ship in free flight such economy might properly be defined in terms of "miles per gallon" of fuel consumed under the flight conditions then existing; or, in some cases it might be defined in terms of "gallons per mile" of flight, depending on the relative values of the rate of gallons consumed compared to the rate of flight. For specified operating conditions affecting the ship at the time of test, it is possible to produce or imagine a curve relating overall economy of operation in terms of "gallons per mile" as affected by a specified variable. Such variable may be propeller pitch, or propeller rotative speed. The overall economy existing at any given time will then be found as the ratio of speed divided by rate of fuel consumption, or the inverse ratio, depending on which way the ratio is desired to be determined. Then, by making a change in the specified variable, any change in the overall economy caused by such change will be reflected as a change of value of the ratio.

Briefly stated, it is a prime object of the present invention to provide means to automatically effect changes in a selected variable so that, under the operating conditions then existing, other than such variable, the ratio of speed divided by rate of fuel consumption (as an illustration) shall be raised to the maximum possible value (namely, the peak value). The correction operation shall then cease for the time being. Thus a maximum economy of operation will be assured when the correction is effected by change in the value or condition of the selected variable, such change being in the proper direction to produce, if possible, rise in the value of the determined ratio.

It is a further object of the invention to promptly detect by an automatic operation or sensing operation, whether the selected variable is now being changed in direction to increase the economy; and in case the direction of change of such selected variable is found to be negative (decreasing ratio), a reversal of the direction of change of such selected variable will at once occur so that the correction will then be produced in direction proper to effect increase in the value of the ratio, assuming that the peak value of the curve is greater than the ratio then existing and determined.

It is a further prime object of the invention, once the corrective change of such selected variable has been instituted, to effect change in the proper direction for increase of economy, to continue such change in such selected variable in such direction until a time arrives when further change of such variable in that direction will actually commence to decrease the value of the ratio (the economy); in other words, to continue such proper corrective change until the peak of the curve of economy has been attained (at which point the sign of the first derivative, being the rate of change, changes between plus and minus or between positive and negative).

It may also be stated that a prime object of the invention consists in the provision of means to measure both of two rates whose ratio is to be determined, to divide one rate by the other to determine the ratio between them, and if that ratio is different from the ratio previously existing between them, to deliver a signal to a corrective unit which signal will institute correction by an operation producted by a unit which unit's operation affects the value of one of the rates whose ratio instituted the operation, such correction operation continuing until a maximum ratio value has been attained.

More specifically, it is a further object of the invention to provide means whereby if the corrective operation instituted as stated in the preceding paragraph is in the wrong direction, so that decrease of the ratio's value is produced by such corrective operation as instituted, a reversal of direction of correction will promptly occur, thus ensuring correction in the proper direction for increase of the ratio due to such corrective operation, and with continuation of such corrective operation to the condition which produces a maximum ratio value as between the two rates in question.

Still more specifically, it is a further object of the invention to provide a corrective servo-power unit, such as a motor, whose operation will act to produce the correction operation of the corrective unit, such motor conveniently being reversible so that its corrective effect may be produced in either direction as dictated by the needs of the operation, and as explained in the preceding paragraph.

I have, by way of illustration only, previously referred to the control and operation of airplane propellers for maximum economy of operation by use of the inventive features herein disclosed. It will be understood that these inventive features are also applicable to many other operations, and for many other purposes than the automatic control of propeller speeds and pitches for flight at pre-selected airplane speeds, under maximum economy conditions. Thus, for example, such units may be used for controlling the economy of production of power delivered by a prime mover driven generator, wherein it is desired to control the economy of the power production and delivery from such prime mover driven generator unit. In the drawings hereinafter to be described, examples of such uses of the control units are disclosed. Other similar uses will suggest themselves to the student of this specification, and I do not intend to limit the present invention to such particularly disclosed uses and combinations, except as I may do so in the claims to follow.

Other objects and uses of the invention will appear from a detailed description of the same, which consists in the features of construction and combinations of parts hereinafter described and claimed.

Figure 6:
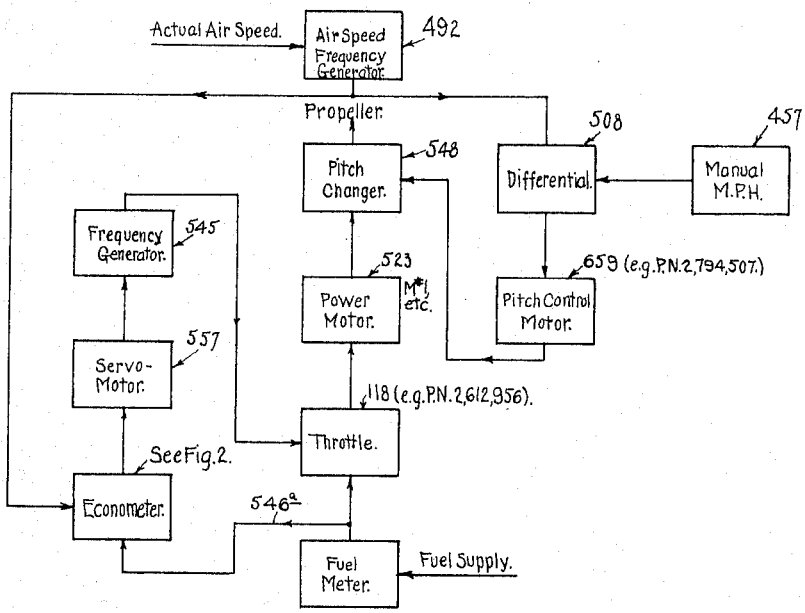

In the drawings:

FIGURE 1 shows by way of illustration only, several typical performance curves of an airplane equipped with propellers and shows how the economy of operation, overall, may vary under different operating conditions; these curves constituting a family of such performance or characteristic curves;

FIGURE 2 shows by way of illustration only, a schematic layout of an "Econometer Unit" by which provision has been made for automatically comparing free-flight velocity with rate of fuel consumption, to determine the economy of operation, and for automatically readjusting the power-motor speeds or blade pitches from time to time to maintain these speeds or pitches at the values which will give maximum economy of operation; the scheme of FIGURE 2 being usable in connection with the proper elements of FIGURE 3, and also of FIGURE 4, to establish a complete layout for also automatically controlling and synchronizing propeller blade pitches, and other functions;

FIGURE 3 shows schematically a control scheme for airplane control in which a free-flight velocity handle is provided to determine the pre-selected free-flight speed of the ship; this figure also showing the connections from the units which are shown in the figure to the meters which meter the rate of fuel supply to the several power-motors and comprise a portion of the synchronizing and controlling means;

FIGURE 4 shows schematically, an arrangement wherein the setting of the control handle for free-flight velocity serves to effect control and synchronization of the pitches of the blades of the several propellers to maintain that desired free-flight velocity; and this figure also indicates the connections from the units shown in this figure to the meters which meter the rate of fuel supply to the several power-motors, and comprise a portion of the synchronizing and controlling means;

FIGURE 5 shows a "Flow Sheet" of connections and operations corresponding to the layout of FIGURE 3; and FIGURE 6 shows a "Flow Sheet" of connections and operations corresponding to the layout of FIGURE 4.

In FIGURES 3 and 4, to be hereinafter described, I have shown, schematically, means to generate and transform and deliver power to perform a function, and to control the economy of such power transformation and delivery. Specifically, the power generating means shown in the above figures comprises the propeller driving internal combustion motors of an airplane, the transforming means comprises the means to deliver the so-generated power to the propellers and thus to produce traction, and the power delivering means comprises the propellers which transform the power into the energy and dynamic motion of the airplane. The function is the end result in the form of the desired speed of the airplane; and the means to control the economy of such power transformation and delivery comprises the equipment disclosed in the present application, and its predecessors. Considered in reverse analysis, the specific showings of FIGURES 3 and 4 include fuel consuming prime mover units, means to control the rate of fuel input to said units, and means to transform and deliver the power from said prime mover units and to perform the desired function at a determined rate of delivery, namely the means to transform the delivered power to a determined speed of the ship. The means to control the economy of the power transformation and delivery comprises the novel ratio determining element shown in FIGURE 2, together with the servo-motor or equivalent element, whereby changes in the determined ratio are properly communicated to the servo-motor in the proper direction of drive of such motor, and for the purpose of effecting corrections in the overall operation which shall ensure rise of the economy of operation to the peak value possible under the operational conditions then existing.

Thus, in both of FIGURES 3 and 4 a prime-mover is provided, driving a propeller, with throttle and pitch control available to enable production of the desired rate of delivery of the power needed to propel the ship at a predetermined speed; and with the presence of the ability to effect such speed of drive by various combinations of throttle control, pitch control, and propeller speed. Thus the illustration of two forms of propeller driven ship is by way of illustration of embodiments which include the overall combinations of elements which act together to enable production of that intended end result (speed of the ship) with consumption of a minimum rate of the fuel per unit travel; which is the same as producing a desired rate of power output with a minimum rate of fuel input. Accordingly, the illustration of my present invention in connection with an airplane drive control is not by way of any limitation of the usefulness of the invention, except as I may limit myself in the claims to follow. With the foregoing brief statement of relationships, the following description is in order:

For any given set of operating conditions, such as power demand, etc., there is an optimum set of specifications in the operation of the propeller to secure maximum economy of operation. For example, for any specified propeller the economy of operation thereof will vary with rotational speed, and such variation may be determined for a given pitch of the blades, etc. For any such given set of conditions, however, a curve plotted to represent overall economy vs. rotational speed will rise to a maximum value, and will then descend, so that there is, for such propeller and for any specified pitch angle of the propeller blades, an optimum speed of rotation to secure maximum economy in its conversion of fuel into power to sustain flight. A family of curves may be plotted showing overall economy vs. rotational speed, each curve showing overall economy for a specified blade pitch, all other operating conditions remaining constant. Other families of curves may also be determined and plotted between overall economy and single selected variable operating conditions. For example, such a family of curves may be plotted wherein each curve shows overall economy vs. blade pitch, each such curve showing overall economy for a specified rotative speed, all other operating conditions remaining constant. An infinite number of such curves may be plotted, each showing the variation of economy with a selected variable condition, all other conditions being held constant. Such other variables may include height above sea-level, air temperature, relative humidity, conditions such as icing, etc. It is, however, desirable to always operate the several power motors at such conditions of rotative speed, pitch of blades, etc., as will give maximum economy of operation overall. This is merely another way of saying that it is desirable, once we have determined on a velocity of free-flight, to maintain that velocity with the power-motors and propellers operating under those conditions which will require the least total fuel for the trip. I shall now show how I have provided automatic controls which will give these results.

For this purpose reference may be had to FIGURE 2 which shows schematically a set of controls largely supplemental to those shown in FIGURE 3, presently to be described, and other arrangements such as shown herein, and in Letters Patent, No. 2,794,507, issued June 4, 1957, from which case the present application is descended. FIGURE 3 has not been reproduced in FIGURE 2 largely to simplify these disclosures. In FIGURE 2, I have reproduced the generator 492 whose rate of rotation is proportional to the velocity of free-flight, and the generator 545 whose rate of rotation is proportional to the rate of fuel consumption. The lines 541ª and 546ª leading from these generators are also shown in FIGURE 2. These lines carry frequencies proportional to air speed and rate of fuel speed, respectively. In FIGURE 2, I have shown means to automatically compare these frequencies and determine at all times the ratio between them. This means as shown in FIGURE 2 comprises two cylindrical members 565 and 566, mounted for rotation on their longitudinal axes, and parallel to each other. The element 565 is provided with the surface groove 567 which is of logarithmic form, and the element 566 is provided with the surface groove 568 which is also of logarithmic form. These grooves are conveniently determined on the naperian system, and each groove includes at its beginning or left-hand end a turn which is arbitrarily formed merely to take care of the infinitely long portion which such curve would otherwise have, and which arrangement is proper in view of the uses to which these grooves are to be placed, as will presently appear.

Furthermore, these two grooves are conveniently cut for several revolutions around each cylinder, so that a sufficiently large numerical denomination range of absolute values may be accommodated on a cylinder of convenient length. For example, if the free-flight velocities to be taken care of run as high as 600 miles per hour, the groove of the cylinder 565 should be so cut as to read to that amount, or proportionate thereto; and if the rate of fuel consumption should amount to as much as 1000 gallons per hour the groove of the cylinder 566 should be so cut as to read to that amount, or proportionate thereto.

The cylinder 565 is mounted for rotation, but not for endwise movement; whereas the cylinder 566 is mounted for both rotation and endwise movement. That fact is attested by the dotted portions at the ends of the cylinder 566 representing, at the left-hand end, the normal or initial or unmoved position of such cylinder, and at the right-hand end, the fully moved or extreme position of such cylinder. Between these two cylinders is movably mounted or carried the slide 569. This slide preferably has its side walls formed on arcuate segments to snugly embrace the surfaces of the two cylinders, but the slide is free to move readily according to the dictates of the grooves. This slide has two outwardly extending pins which engage the grooves of the two cylinders, so that the slide will function according to the respective cylinder positions and conditions of cylinder rotation. Furthermore, it will be evident that the endwise moved position of the slide will depend on the number of turns which the cylinder 565 has performed from its initial or unmoved position, the slide moving toward the right in FIGURE 2 as the cylinder 565 rotates in the direction representing increase of velocity of free-flight. The slide also engages the groove of the cylinder 566. Therefore the endwise position of such cylinder 566 with respect to the slide will depend on the amount by which said cylinder has been rotated from its zero position against the force of the spring 578. That amount of rotation against such spring will depend on the rate of fuel feed. Such rotated position of the cylinder 566 will cause endwise movement of such cylinder towards the left in FIGURE 2. Thus the net endwise movement of the cylinder 566 from its zero or starting position (shown by the dashed lines in FIGURE 2) will be equal to the rightward movement of the slide (produced by the rotated position of the cylinder 565) minus the leftward movement of the cylinder 566 with respect to the slide (produced by the rotated amount of the cylinder 566). In this connection it will be understood that the two cylinders 565 and 566 are respectively turned, in comparison to the manner in which their grooves are formed, in such directions that the velocity cylinder 565 tends to set the slide towards the right, whereas the turning of the fuel rate of flow cylinder 566 acts to move said cylinder 566 back towards the left due to engagement of a pin of the slide with the groove of such cylinder 566. It is here noted that provision is made to turn each cylinder through a total angular displacement from its zero position to correspond to the flight speed or to the rate of fuel flow as the case may be represented by such cylinder's turned position. This will be further explained hereinafter.

Another way of considering the matter is that the slide tends at all times to subtract the reading of the cylinder 566 as would be shown by its turned position, from the reading of the cylinder 565 as would be shown by its turned position. Due to the simultaneous engagement of the slide with both cylinder grooves, and the fact that the cylinder 565 is held against endwise movement whereas the cylinder 566 is capable of endwise movement it follows that the cylinder 566 will assume an endwise moved position which is equal to the difference of axial components of the turned positions of the two grooves; in other words the cylinder 566 will always assume an endwise moved position which is the difference between the logarithm of the velocity of free flight minus the logarithm of the rate of fuel consumption. This difference of logarithms is the logarithm of the quotient obtained by dividing the rate of free-flight by rate of fuel consumption, or miles per gallon or per hundred gallons, or the like. The endwise moved position of the cylinder 566 may be readily indicated by the circular groove 569a near one end of such cylinder, and the suitable indicator is readily engaged with such groove to read on a scale of miles per gallon, or the like. In the present case I make use of the endwise movement of this cylinder 566 to actuate certain throttle, rotational speed, and pitch controls which will automatically re-set at all times the various operational elements to the optimum conditions to which I have referred.

At this point I will mention that it is of course needed to insure that the cylinders 566 and 565 will at all times assume turned conditions proportionate to the rates of fuel consumption and of flight, respectively, and also to ensure that the turned position of each cylinder shall remain unchanged until there is a change of the value of the corresponding function. Such changes of corresponding function are change of the turned position of the cylinder 565 with change of flight speed, and change of the turned position of the cylinder 566 with change of rate of fuel feed or change of power. I shall now show one means which I use to accomplish this result:

I provide a small induction motor element 570 for the cylinder 565 and another small induction motor element 571 for the cylinder 566. Each of these induction motor elements includes the polyphase wound stator 572 and the rotor element 573 or 574, as the case may be, influenced by its stator element. The rotor 573 is connected to the shaft 575 of the cylinder 565, and the rotor 574 is connected to a shaft 576 which is splined to the cylinder 566 so that the turned condition of the cylinder 566 is at all times dictated by the rotor 574 even while allowing for endwise movement of said cylinder 566. The springs 577 and 578 tend to return the shafts 575 and 576 and the corresponding cylinders 565 and 566 respectively, to their initial or zero positions; and these springs are calibrated so that they permit turning of the respective cylinders by amounts proportionate to the respective rates to be measured. In this connection it is noted that the torques developed by the respective rotors 570 and 571 will be proportionate to the frequencies of polyphase currents delivered to their stators, so that the turning efforts exerted by the respective rotor shafts will result in turnings of said shafts against their springs until these turning efforts have been equalized by said springs, so that the turned positions of the cylinders will at all times be proportionate to the frequencies heretofore referred to. Manifestly any other suitable means might be substituted for converting frequencies of the lines 541a and 546a into proportionate angle of turn if desired without departing from the spirit of the present invention. For example, there might be used centrifugal devices operated at the speed of the motors driven by the frequencies on the lines 541a and 546a to set the cylinders to turned positions corresponding to said frequencies, or other schemes might be substituted for that indicated in FIGURE 2.

As respects the induction units 570 and 571, it will be understood that the torque delivered by the squirrel cage rotors 573 and 574 of these units will depend also on the voltage developed by the units 492 and 545, so it will be desirable that means be provided for maintaining constant voltages delivered by these generators at varying speeds, as may be done for example by regulation of their field strengths, somewhat according to the disclosures of Letters Patent No. 2,612,956, previously referred to herein and issued to me, and as shown for example in FIGURE 1 of that patent at 135. Also, wound rotors might be used in the induction units 570 and 571, with suitable means to adjust the resistances in series therewith to thereby ensure desired calibration of said units with respect to the springs 577 and 578. It is of course understood that the rotors serve to turn the respective cylinders to rotated positions corresponding to the respective frequencies, and then the rotors remain stationary so that the conditions of torque become those of an induction motor at 100% slip. In FIGURE 2, I have indicated the reversible motor 557 corresponding to the reversible motor 557 in FIGURE 3. Such a motor 557 is also shown in FIGURE 4. This motor in FIGURE 2 serves to control the rheostat 561 which controls the frequency of polyphase current supplied over the lines 539 (FIGURE 3) to the propeller pitch control devices, so by control of this motor 557 in FIGURE 3 we shall control motor speed of the power-motors and propellers by pitch control, while maintaining the rotating speeds of the power-motor-propeller units in synchronism. These controls are effected by the endwise positioning of the cylinder 566 of the "Econometer" shown in FIGURE 2, as I shall now show.

Reference to FIGURE 1 shows typical performance curves for a specified propeller, as respects variation of overall efficiency or economy with rotational speed, for several typical conditions of blade pitch, elevation above sea-level, etc. Each of these curves shows the above relationship between overall efficiency or economy and rotative propeller speed for such stated conditions and other conditions. Evidently an infinite number of such curves might be plotted, each one on the basis of a change of specified amount in any one of the conditions affecting economy. Other similar curves could be plotted showing the relationship between overall efficiency or economy and blade pitch or angle of attack for a given set of conditions including rotative speed, elevation above sea-level, humidity of the atmosphere, icing, and many other factors. In such case, too, an infinite number of such curves might be plotted, each on the basis of a change of a specified amount in any one of the conditions affecting economy. Thus the full line curve 579 may represent such performance curve for a given set of conditions, and curves 580, 581 and 582 may represent performance curves under three other sets of conditions. Now it will be noted that in the case of each curve there is an optimum point, indicated by the peak of the curve, these peaks being shown at 583, 584, 585 and 586 for the four curves 579, 580, 581, and 582, respectively. The attainment of the maximum overall efficiency or economy may be effected by change of either blade pitch or rotational speed, or both, as will hereinafter appear. When the control for maximum economy is effected by change of rotative speed it is desired that no matter what operating conditions may be in force, the rotational speed of the power motors shall be brought to that value which will correspond to the peak of the curve for such operating conditions, so that the velocity of free-flight may be maintained at minimum expenditure of fuel, and for other desirable reasons which will be evident.

When the control for maximum economy is effected by change of blade pitch it is also desired that no matter what operating conditions may be in force, the blade pitch of the propellers shall be brought to that value which will correspond to the peak of the curve for such operating conditions, so that the velocity of free-flight may be maintained with minimum expenditure of fuel, and for other desirable reasons which will be evident. When the control is by variation of rotative speed it is evident that provision must be made for automatically bringing the blade pitches of the propellers to proper values for development of the total traction needed to maintain free-flight speed of the airplane at the speed pre-set by the pilot's control unit such as the handle 428 in FIGURES 3 and 4. When the control is by variation of blade pitch it is evident that provision must be made for automatically bringing the rotative speeds of the motors and propellers to proper values for development of the total traction needed to maintain the free-flight speed of the airplane at the speed pre-set by the pilot's control unit such as the handle 428 above mentioned. All such means are herein disclosed.

Now examination of these several curves (FIGURE 1) shows that in passing from one of them to another we may find it necessary to increase power-motor speed, or in other cases to reduce such speed, to operate on the peak of the curve which corresponds to the new operating conditions. Thus, if operating or other conditions change so that we may pass from the curve 579 (peak at 1575 r.p.m.) to the curve 582 (peak at 1875 r.p.m.) we should increase the r.p.m from 1575 to 1875; whereas if operating conditions change so that we pass from the curve 579 to the curve 581 (peak at 1325 r.p.m.) we should decrease r.p.m. from 1575 to 1325. It is also noted that in passing from the optimum condition of one curve (due to one set of conditions) to the optimum condition of another curve (due to another set of conditions) we may find that our new overall economy is either greater or less than that previously existing. This is the same as saying, for example, that the best performance possible at one elevation above sea-level will be different from that possible at some other elevation above sea-level. It is thus evident that we shall, in order to hold the optimum economy at the new set of conditions by control of rotative speed, sometimes have to increase such rotative speed, and sometimes decrease such speed by proper control of the motor generator unit 433; and it is further evident that the movements of the cylinder 566 of the "Econometer" will sometimes be to the right in FIGURE 2, and sometimes to the left in said figure, depending on whether or not the new set of conditions give greater or smaller optimum economy. It is further evident that it is desirable to bring about the controls of the rheostat 561, and therefore of the operations and direction of rotation of the motor 557, in FIGURE 2, entirely automatically, and merely by movements of the cylinder 566 endwise as the economy of operation changes from time to time, due to changing conditions of operation. At the same time it is an object to ensure that in every case the re-adjustments of the rheostat 561 will be such as to ensure optimum conditions of economy under the new conditions of operation. In other words, it is the object to ensure maximum economy of operation, and minimum fuel consumption at all times, automatically produced by the controls now to be disclosed.

Referring to FIGURE 2 I provide a finger 587 which engages the encircling groove 569ª of the cylinder 566 so that said finger moves back and forth as dictated by the changing economy of operation. Movements of said finger towards the right represents increase of economy, and movement towards the left, decrease of economy. Said finger carries a motor circuit closing contact element or finger 588, and a motor contactor 589 is actuated back and forth by this finger 588 but with a slight amount of play, due to the pin and slot engagement shown at 590. Said contactor 589 has contacts facing in both directions. There is a contact follower 591 which is mounted to ride back and forth with the finger 588, being moved in either direction by the contact engagements, and said contact follower 591 carries the two contacts 592 and 593 which are insulated from each other, and are separated slightly more than the total separation between the two contacts of the motor contactor 589. In the position shown both of the contacts of the motor contactor 589 are disengaged from the contacts 592 and 593 of the contact follower 591.

The contact follower 591 has the two contacts 592 and 593 so mounted that as the motor contactor moves in either direction and contact is established with either of the contacts 592 or 593, further movement of the motor contactor will cause said contact follower to follow the movement of the motor contactor to some new position of measured economy as established by the changed conditions of operation due to such movement of the motor contactor, so that in case of slight retrograde movement of the motor contactor at such new position the contacts of said motor contactor will both disengage from the respective contacts 592 and 593, allowing the contact follower to remain in its new position for the time being, but ready for another movement in either direction as needed at some future time.

Just behind the contact 592 is another contact 594 also carried by the contact follower 591, and normally free of the contact 592; and when the motor contactor 589 is moved towards the left (decreasing economy) it first engages the contact 592, and then if movement towards the left is continued slightly, there will be established engagement with the further contact 594 for reasons presently to become apparent. The arrangement is such that in movement towards the left (lowering economy) the movement of the motor contactor 589 will not cause the contact follower to actually commence movement towards the left merely by engagement with the contact 592 but there must be a further slight leftward movement, to bring the contact 592 against the contact 594 in order to cause leftward movement of the contact follower 591.

The contact follower 591 also carries another contact 595 which will be engaged by the contact 596 of the motor contactor 589, slightly prior to engagement of the contact 592 by the adjacent contact of the motor contactor 589. In other words, during a leftward movement of the finger 587 (lowering economy) the sequence of contacts is as follows: motor contactor with contact 595, then motor contactor with contact 592, then contact 592 (and motor contactor) with contact 594, both of contacts 595 and 592 remaining engaged.

The rheostat shifting motor 557 is shown as having the two field coils 558 and 559 of opposite windings so that either of these coils may be brought into the series circuit with the motor armature, but with reversal of direction of armature rotation. It is intended that when a slight movement of the finger 587 of the economy ratio determining device takes place in either direction, there shall be set up a sequence of operations to reset the motor 557 and therefore the rheostat 561 to bring about a new speed of the motor generator supplying the lines 539 so that the new speed of power-motor operation shall ensue. Such slight movement of the finger 587 in either direction also moves the motor contactor; and in case of movement towards the right the contact 593 will be engaged after a very slight movement of the motor contactor, whereas in case of movement towards the left the contact 595 will be first engaged and very shortly thereafter the contact 592 will be engaged. The motor contactor 589 connects by the line 597 with a source of direct current supply, such as the battery 598 (or battery shown in FIGURE 3), so that one pole is always in connection with said motor contactor 589. The contact 593 connects to the armature side of the series motor 557 by the line 599, and the solenoid of a relay 600 is placed in this line, so that said relay is always energized when the contact 593 is engaged. The contact 592 connects by the line 601 with the line 599 at a point beyond the solenoid 600, and the solenoid of a second relay 602 is placed in this line 601.

It is now evident that whenever either of the contacts 593 or 592 is engaged by the motor contactor one pole of the supply line will be connected directly to the armature side of the motor 557. There is provided a reverser 603 including the solenoid 604 acting on the armature 605 to pull same down against the spring 606, and said armature carries the flexible projection 607 at its lower end. The contact carrier 608 is pivoted at 609, and has the arm 610 carrying the contact 611. There are placed two contacts 612 and 613 adjacent to one extreme movement of the contact 611, and two contacts 614 and 615 adjacent to the other extreme of movement of said contact 611. In either extreme of movement of the reverser the contact 611 will engage one of these pairs, 612–613 or 614–615, as the case may be. The arm 610 has the cam surface or block 616 which will be engaged on one or the other of its faces by the flexible projection 607, so that said arm will be tilted first in one direction and then in the other with succeeding excitations of the solenoid 604. In other words, the single solenoid serves to operate the reverser by successive pulses to the solenoid, first in one direction and then in the other direction, to place the contact 611 first in engagement with the contacts 612 and 613, and then in engagement with the contacts 614 and 615.

The free terminals of the two field coils 558 and 559 connect to the contacts 614 and 613, respectively. The reverser contact 612 connects to the other terminal of the battery or source of current by the line 617, a flexible connection 618 being provided in this line if desired. It is now evident that movement of the motor contactor 589 in either direction due to change in measured economy as determined by the movement of the cylinder 566 endwise will result in closing of a circuit through the motor 557, and that rotation of such motor will be in direction dependent on the position of the contact 611 and arm 610 as last set by a previous operation. Such direction of motor operation may, therefore be to either increase or decrease rotational rate of the power-motors of the airplane, and up to this point the control device has merely served to bring the motor into operation for a corrective result. If the direction of motor rotation be such as will establish conditions resulting in increased economy, then there will promptly follow a movement of the cylinder 566 towards the right in FIGURE 2, whereas if the direction of motor rotation be such as will establish conditions resulting in a decreased economy, then the cylinder 566 will promptly commence to move towards the left in FIGURE 2. It has already been shown that sometimes changed conditions will require increased rotative speed of the power-motors to ensure optimum economy, whereas in other cases a decrease of rotational speed of the power-motors will be required; but with the arrangement so far disclosed the closing of the motor circuit may or may not be for motor operation in the proper direction. I shall now show how such proper direction of motor rotation (motor 557) will be automatically produced:

It is to be remembered that when once an optimum condition of operation has been produced, power-motor speeds being proper for such optimum condition, the motor contactor 589 stands free of all the contacts 592, 593 and 595, and until there comes a change in the economy as metered by the position of the cylinder 566 this condition will continue. As soon, however, as there is any change of operating conditions which will change the economy, the cylinder 566 will shift either to the right or to the left, thereby establishing connection to one or the other of said contacts, and setting into motion the corrective devices herein disclosed. Such corrective action should and will then continue in the proper direction until the motor-propeller condition (rotational) of the power motors has been brought to the point for optimum economy under the new conditions, whereupon further correction will cease. This result is obtained as follows:

First assume the condition that a slight increase of economy occurs so that the cylinder 566 is moved towards the right. In such case the motor contactor 589 will shift towards the right and almost immediately contact will be established with the contact 593. This will close the motor circuit for motor rotation in direction dictated by the previous setting of the reverser. If that direction is correct for the new operating conditions, that is, if the new operating conditions are such that maximum economy of operation will be secured by increase of power-motor rotative speed, then the action of the cylinder movement will be cumulative, and it will continue to move towards the right, as we are improving economy of overall operation by increasing the power-motor speed. This might be the case for example if the flight conditions changed so that instead of the curve 579 of FIGURE 1, representing the relation of overall economy to rotative speed, the curve 582 of said figure has now become the one representing the relation of overall economy to rotative speed. Presently we shall arrive at a power-motor speed of 1875 r.p.m. such that further increase thereof will cease to improve economy, being the peak point 586. Finally, as we move over the peak of the curve the overall economy will actually decrease. At that instant, when we have just passed the peak of the curve, there will occur a retrograde movement of the finger 587, and of the motor contactor 589, so that at once the motor contactor will break away from the contact 593, opening the motor circuit, and leaving the power-motors to continue operation at the newly adjusted rotational speed, and with maximum economy under the operational conditions now in force.

Next suppose that when the motor contactor 589 moves to the right and engages the contact 593, thereby closing the motor circuit, the direction of motor rotation will be found to be such as to bring about an actual decrease of economy. This condition might arise for example in case of transition from the curve 579 to the curve 581 (FIGURE 1). Examination of FIGURE 1 shows that the rotational speed of the power-motors should now be reduced to secure peak curve economy under these new conditions of operation. It is remembered that the reverser was previously set to position to cause rotation of the motor 557 in direction for increase of power-motor rotational speed. Such being the case (reverser being in its previously set position), we have commenced motor rotation in the wrong direction, and the cylinder 566 will commence to move towards the left, caused by lowering economy of operation. It is thus evident that provision should be made for shift of the reverser position so that the motor 557 will be caused to rotate in direction to reduce power-motor rotational speed. This is done as follows:

It was previously stated that there is a pin and slot connection at the point 590 between the finger 588 and the motor contactor 589, so after contact has been established between the motor contactor 589 and the contact 593, such engagement of contacts will be retained, not withstanding a slight backward or leftward movement of the finger 587, until the contact 596 engages the contact 595. Said contact 595 connects by a line 619 to a contact 620 of the relay 621. Said relay has its solenoid 622 connected at one end to the line 623 which extends to a contact 624 of the relay 600 whose solenoid is in the motor circuit from the contact 593 as already explained. The armature contact 625 of the relay 600 connects by the line 626 to the battery terminal to which the motor contactor connects, so that when the contact 593 is engaged by the motor contactor to place current through the motor, the relay 600 raises its armature, and the contact 624 is engaged by the armature contact 625, and the solenoid 622 of the relay 621 is thus connected to one end of the source of current. The other end of the solenoid 622 connects by the line 627 to the contacts 612 and 615 of the reverser, so that in either position of said reverser said line 627 connects back to the other terminal of the source of curent. It is now evident that regardless of the position of the reverser at the commencement of the series of operations, as long as the motor contactor 589 retains engagement with the contact 593, even during the slight backward movement to engage the contact 596 against the contact 595, the solenoid 600 is energized, and thus the solenoid 622 is also energized to retain its armature elevated. Said armature carries the contact 628 which is mounted on a block of insulating material; and said contact 628 connects by the line 629 to one end of the reverser solenoid 604, the other end of said solenoid connecting by the line 630 to the line 617, leading back to the source of current.

The line 623 which connects to one end of the solenoid 622 of the relay 621 also connects to the contact 631 in position to be engaged by the armature of said relay, which armature connects by the line 632 to the other terminal of the source of current. Following out the conditions so far established it will be seen that the engagement of the motor contactor 589 with the contact 593 served to raise the relay 600, while at the same time bringing the motor into operation in the wrong direction. The raising of the relay 600 served to energize the relay 621, raising its armature, thus causing engagement of said armature with the contact 631. This will establish a circuit from the battery 598, over the lines 626 and 632 to the armature of the solenoid 622, thence by contact 631 to top end of solenoid 622, through said solenoid, over line 627 to reverser contacts 612 and 615, to contact 611 (when the reverser is in one of its extreme positions or the other), pigtail 618, and over the line 617 back to the battery. Thus it will be seen that once the armature of the relay 621 has been raised (the reverse being in either extreme position of its movement) a local circuit is established through the contact 631 which will hold the armature of the relay 621 in raised position even when the armature of relay 600 is deenergized by movement of the motor contactor 589 to the left so as to disengage from the contact 593. Thus the relay 621 is now self-energized by a "holding" operation. Raising of said armature of relay 621 served to close circuit through the reverser solenoid, thereby delivering an impulse and reversing the contacts and also reversing the field of the motor 557 which is the desired result. At the same time it will be noticed that as the contact 611 of the reverser was thrown from one extreme of movement to the other it momentarily opened the circuit of the line 627, so that the solenoid 622 of the relay 621 was momentarily de-energized and dropped its armature to the position shown in FIGURE 2 thus terminating the self-energization of such relay 621. However, as soon as the reverser contact 611 reached the other extreme of movement it re-established contact with the other of the contacts 612 or 615, as the case may be, ready for another operation at a future time. The locking contact 631 and the temporary holding of the relay 621 serves to ensure that the above operation will be carried through even in case of actual opening of the circuit between the motor contactor 589 and the contact 593 prior to closing of the contact between the motor contactor 589 and the contact 595.

Upon causing reversal of the reverser as just explained the motor 557 will reverse rotation and thus cause the power-motor rotational speed to be modified in the proper manner to bring about increased economy, thus causing the cylinder 566 to again move towards the right, and bringing into action the contact 593. During this operation the motor contactor will shift to engagement with the contact 593, then leave the contact 592, and supply of current to the motor 557 will come from said contact 593 until the rotational speed of the power-motors has been increased to the value needed to attain the peak of the curve of overall economy now available. When the new condition of maximum economy has been reached and the peak of the curve is slightly over-run, retrograde movement of the finger 587 to a very slight degree will open the circuit by backing the contactor 589 away from the contact 593 and bring the corrective operation to termination. Thus we have effected correct re-adjustment of the power-motor speed in both of the cases where the initial movement of the cylinder 566 is towards the right, meaning that in the initial disturbance there was a tendency towards increase of economy as indicated by operation of the "Econometer." I shall now consider the conditions where the initial condition of disturbance is such that the cylinder initially moves towards the left, that is, towards lower economy conditions.

Assume that the original disturbance was such as to decrease economy, thereby moving the cylinder 566 and motor contactor towards the left. Slight movement will bring the contact 596 into engagement with the contact 595 thereby delivering an impulse over the line 619 to the contact 620; and since the relay 621 was locked up from a previous operation, this impulse will continue through the contact 628 and line 629 to the reverser solenoid, thereby setting the reverser over to its opposite position. Slight further movement of the motor contactor towards the left will bring the motor contactor 589 against the contact 592. This will supply current to the motor over the line 601 and solenoid of the relay 602, and line 599; and if direction of the motor operation was correct (after having been just reversed by the reverser) for increase of economy, then motor operation in the proper direction will commence for increase of economy. Now, since the relay 600 is down, its armature 625 will engage then contact 633, which connects by the line 634 with the contact 635 above the armature 636 of the relay 602, so that when the relay 602 raises its armature it will be locked up, and current will continue to be supplied to the motor irrespective of the continued engagement of the motor contactor 589 with the contact 592. Therefore the increase of power-motor overall economy will cause the cylinder 566 and finger 587 to move to the right, breaking contact between the motor contactor 589 and the contact 592; but still current for corrective action will be supplied to the motor due to the locking up of the contact 636 against the contact 635. This corrective action to increase economy will continue until finally the contactor 589 moves over far enough to engage the contact 593, whereupon current will be supplied through the relay 600 in manner already explained. The energizing of the relay 600 will cause its armature to rise thereby opening the circuit over the line 634; and since the line 601 is no longer supplying current through the relay 602 said relay will fall and open the circuit at the contact 635. Thereafter current for continued corrective operation of the motor will be supplied over the line 599 from the contact 593, and when the condition of optimum or maximum economy is reached the motor circuit will open at the position of the contact 593, due to reversal of cylinder movement, and the operation has been completed.

Next we consider the condition encountered when the disturbance to operating conditions causes movement of the cylinder towards the left, and in which the reverser is set for motor operation in such direction as to continue such left-hand movement of the cylinder by motor operation to still further reduce the economy. For example, assume that when the motor contactor contact 596 has engaged the contact 595 the reverser has thrown the contact 611 to position to cause operation of the motor 557 in the economy reducing direction. In such case the finger 587 will continue to move towards the left, after engagement of the contacts 596 and 595, and almost immediately thereafter the motor contactor 589 will engage the contact 592, causing motor operation in the wrong direction, and the finger 587 will continue its movement slightly towards the left, bringing about engagement of the contact 592 with the contact 594. Immediately there will be delivered an impulse of current to the solenoid 604 of the reverser, and at once the reverser will throw over, reversing the fields of the motor, and reversing direction of motor operation. This will immediately cause a corrective action to take place in the proper direction, and the economy of operation will rise, with attendant movement of the finger 587 and motor contactor towards the right. During these operations the relay 600 was not yet energized and its armature was down, but the relay 602 was energized by engagement of the motor contactor with the contact 592, so that said relay 602 will be raised and locked up until the motor contactor engages the contact 593. This will energize the relay 600 which will then rise opening the holding circuit at the point 633, and current will continue to be delivered to the motor in proper manner to continue the corrective effect until the peak of the performance curve is reached whereupon very shortly thereafter the slight backward movement of the finger 587 and motor contactor 589 will open the circuit, the operation having been completed.

Consider the controls of FIGURE 2 in conjunction with those of FIGURE 3, and on the assumption that the lines 563 and 564 of FIGURE 3 have been discarded and the upper armature terminal of the motor 559 in FIGURE 3 is connected to the line 599 in FIGURE 2, and that the two fields of the motor 599 are connected to the reverser contacts 613 and 614 of FIGURE 2, so that the motor 557 of FIGURE 3 becomes in effect the motor 559 of FIGURE 2 and is controlled by the Econometer according to the principles already set forth in detail. Then it will be seen that a very complete and fully automatic control system will be provided. If we assume that the original setting of the handle 487 for power-motor speed control was below the normal speed range required for the pre-set free-flight velocity as dictated by the setting of the handle 428 it will be seen that the only control required to be manually made during flight will be that of the air-speed as determined by the handle 428. When that handle is set to a given velocity condition the power requirements needed to maintain that velocity will be automatically adjusted from time to time by the motor 549; the power-rotational speeds will be automatically adjusted from time to time to maintain maximum economy of operation, that is, lowest fuel consumption consistent with the free-flight velocity being maintained; and the propeller blade pitch settings will be automatically adjusted from time to time to ensure the consumption of the power being delivered by the power-motors and as determined by the requirements of the free-flight velocity; and furthermore, all power-motors will be required to deliver the same amount of power (synchronized for power); and all power-motors will be synchronized for rotational speed. Whenever the pilot may re-set the handle 428 to a new free-flight velocity the power setting will automatically be reset, the power-motor rotational speeds will adjust themselves for maximum economy of operation under these new conditions; and all other factors will also be re-set to meet the new conditions, all without additional manipulation or thought on the part of the pilot, and while maintaining synchronism of powers and rotational speeds of all of the power-motors. Thus the pilot need concern himself only with the one control handle or element during flight. At the same time he will have knowledge that the desired velocity is being maintained, and the trip being accomplished with minimum amount of fuel consumption, consistent with that velocity and the existing conditions such as elevation above sea-level, etc.

I shall hereinafter describe FIGURES 3 and 4 in sufficient detail to make clear the airplane control arrangements shown in those figures, so that the statements contained in the foregoing paragraph will be better understood, and the means whereby the results stated in that paragraph may be produced.

It is noted that in the schematic layout of FIGURE 2 the frequency delivered over the lines from the generator 545 to the induction unit 571 is the control frequency by which the several power-motors are being controlled for power output, and by which said power-motors are being synchronized. Therefore this frequency from this generator 545 will be proportional to the power out-puts and rates of fuel flow to the several power-motors. If desired, however, a special fuel metering device or meter might be placed in the fuel line delivering fuel to the power-motors, and driving a polyphase generator, which generator would be the one delivering the frequency to the lines leading to the induction unit 571. In such case the generator 545 might be a special generator driven by a special fuel metering device by which the fuel actually delivered to the power-motors was measured, and thereby a very accurate and positive measurement of fuel consumption would be ensured for operation of the ratio determining device.

If desired a double-throw, three pole switch might be provided for the small motor 557, so that thereby said motor could be connected either as shown in FIGURE 3, or as shown in FIGURE 2, at the option of the pilot. I have not deemed it necessary to illustrate all of the connections for such alternative arrangement, and for such switch, as they are more or less self-evident.

It is noted that the corrective effect of the scheme of FIGURE 2 to ensure optimum economy conditions of operation, is due to closure of a circuit for operation of the motor 557 whereby the corrective operation is directly performed. That closing of the circuit, with the disclosures so far described, depends on a change of position or economy reading of the finger 587 due to change of the cylinders 565 and 566, or one or both of them. Until such a change of the position of this finger 587 takes place the corrective effect will not be instituted. Generally a change of operating conditions will of itself directly result in change of economy or operation, as determined by these cylinders 565 and 566, as will be evident by comparison of the various curves 579, 580, 581 and 582 of FIGURE 1. A change from or between any of these curves, at a given propeller r.p.m. will result in a direct change of economy (as evidenced by the different elevations of these curves at a given r.p.m.), so it will usually happen that a change of operating conditions which results in operation on a new curve of "Net Overall Efficiency" will of itself result in setting into motion the corrective operation of the econometer of FIGURE 2.

Sometimes there will occur changes of operating conditions which, while causing operation thereafter to be on another curve of net overall efficiency, still will not cause at once institution of the corrective changes, or effects. Thus, if for example the new curve passes through the point of the curve on which operation has previously been occurring (usually the peak of such curve), there will occur no change of economy at the r.p.m. at which the power-motors have been operating, and therefore no corrective effect will be produced by the Econometer because the position of the finger 587 will not thereby be shifted to institute such corrective action. For example, if we have been operating at the point 583 of FIGURE 1 (being the optimum condition for the curve 579), and if then operating conditions change so that we commence to operate on the curve 649 which passes through the point 583 but rises to a higher value of economy, the passing to the conditions of curve 649 will not in and of itself result in setting the econometer into operation to effect correction of speed necessary to avail ourselves of the possibly higher point of economy to which this new curve 649 rises as shown in FIGURE 1. This statement is true, since without the production of a change of speed the economy of the operation will continue to be indicated by the elevation of the point 583, which point is mutual to both of the curves 579 and 649. I have, therefore, made provision to institute corrective actions in all cases including those such as I have just described. This provision I shall now explain:

If periodically the motor 557 be brought into action for a short interval of time, sufficient to effect a slight change of operating conditions (e.g., power-motor speed), then the position of the finger 587 will be periodically slightly altered, sufficiently to institute any necessary corrective operations, and to ensure in any case that we are always seeking a better or more efficient overall operating condition. To this end, in FIGURE 2, I have shown the small shunt motor 650, cut directly across the source of direct current but under control of the switch 651, which small motor operates at substantially constant speed, and is in effect a more or less accurate timer. This motor drives a rotary contactor 652 at slow speed, to effect a circuit closing operation, say every five minutes for an interval of a few seconds, by reason of engagement of the rotary contact 653 with the stationary contact 654. These contacts 653 and 654 are bridged across the relay contacts of FIGURE 2, so that whenever this rotary contact functions it supplies current directly to the motor 557 for such short interval, say five or a few seconds, and then cuts motor current off from such motor. But that amount of motor operation will effect such slight change of operating conditions as will institute operation of the Econometer, and correction will then continue and be carried through in the normal manner by the circuits of FIGURE 2.

In connection with the foregoing it is also to be noted that in the normal operation of the Econometer of FIGURE 2 the direction of operation of the motor 557 is always such that the economy was rising to and slightly past the point of optimum conditions when the circuit was broken at the contact 593; and further that the final circuit opening of the scheme of FIGURE 2 always takes place at the contact 593, leaving the reversing switch 603 unchanged. Therefore when the timer next functions in its periodical operations it will cause the motor 557 to operate in the same corrective direction as before, until thereafter some condition shall arise requiring reversal of such motor.

It is of course evident that the curves of overall efficiency or economy entering into the foregoing discussions and disclosures of mechanisms or means can be drawn to relate the efficiency or economy to any selected variable of operating functions which is controllable by the operator, whether such control actually be made by the operator or not. Thus, while I have shown the curves of FIGURE 1 as showing efficiency or economy related to propeller speed as the controllable variable or operating function, they might have been shown as efficiency or economy related to propeller blade pitch as the controllable variable or operating function. Such and other alternative combinations of the operations of the Econometer with elements of the airplane driving and control devices have been shown in the figures by way of illustration of combinations and uses of the devices to which the present application relates, but not by way of limitation of the coverage to be afforded by the patent to be issued on this case.

It is also noted that the elements of the present invention do not operate by examination of any such curves, but only by sensing of effects produced by changes of operating conditions produced by numerous variables, with provision for then effecting corrections of the selected variable which is directly under control of the present equipment. The references to the several curves have therefore been especially for the purpose of better explaining the relative effects produced by the elements of the means herein disclosed and claimed.

Reference is now made to FIGURES 3 and 4 as illustrative of two airplane controls with which the present invention may be used, as follows:

In FIGURE 3 I have shown schematically an arrangement for securing complete control of the several functions automatically and by manual setting of the principal controls of the airplane's power plant. In this figure I have shown the control board having the control handles 427 for power-motor speed and 428 for freeflight air speed, the same working over the scales 429 and 430 suitably marked. Also in this case I have shown the four propeller hubs 519, 520, 521 and 522, the same being provided with the electrical blade pitch control devices, comprising the sets of polyphase wound elements (stator and rotor), including the stator elements 527 (secured to the hubs), and the rotor elements 527ª (rotatably mounted in said stators, and geared to the blade pitch changing studs). Said propeller hubs are also provided with the slip rings 529, 530, 531, 532, 533 and 534, on the propeller shafts 528; and the power-motors 523, 524, 525 and 526 for the respective propellers drive said shafts in understood and conventional manner. There are also shown the respective small polyphase generators 535 for these units, driven from the shafts 528 proportionately to motor speed, and connected to the slip rings 532, 533 and 534 by the lines 538.

This showing also includes the unit 492 comprising a small polyphase generator driven proportionately to free-airspeed of the airplane by a small fan so that the frequency of current delivered over the lines 541ª from such unit 492 is a measure of the actual air-speed of airplane flight at all times in normal operation. This embodiment also includes the motor-generator unit 457 which may be controlled as to speed by the setting of the handle 428, so that the frequency of polyphase current supplied over the lines 463 is a measure of the "set" speed for free-flight; and this embodiment also includes the polyphase differential unit 508 similar to the corresponding unit of other embodiments shown in the aforesaid Letters Patent No. 2,794,507 issued June 4, 1957, and of which Serial No. 662,542, now Patent No. 3,096,469 (being the parent of the present application) was a division. Thus the shaft of this unit 508 will turn in the one direction or the other according to the relative frequencies delivered by the units 457 and 492, to thereby set the finger 512 against either of the contacts 513 or 514 or centrally of said contacts, as dictated by the relative frequencies aforesaid.

The embodiment of FIGURE 3 also includes the unit 433 comprising a motor generator unit whose speed can be controlled by field control, through the medium of the fork 440–441 operated by the handle 427. Thus the normal setting of power-motor speed is dictated by the setting of the handle 427, and by the polyphase lines 539 leading to the slip rings 529, 530 and 531 of the respective propeller blade shifting units.

In the present embodiment I have provided a distinct unit 545 for control of power delivered by the various power-motor units of engines 523, 524, 525 and 526, by throttle control, and in synchronized fashion, preferably by use of such control as that shown, for example, in FIGURES 18 and 20 of Letters Patent of the United States No. 2,612,956, issued to me October 7, 1952, and previously referred to herein. That is to say, the polyphase lines 546 from the small generator of this unit 545 lead to the throttle power control units 50 of FIGURES 18 and 20 of said Patent No. 2,612,956, so that the setting of the speed of the motor-generator unit 545 is a measure of power to be delivered by each of the power-motors, and with all said power-motors synchronized as to such power delivery. In other words with any given setting of the rotative speed of this unit 545 the power called for delivery by each power-motor will be maintained at a given value, and this also means that the conditions of rotative speed and torque demanded by the propeller of such power-motor must be maintained such as to absorb this amount of power, if stable conditions of operation are to be maintained.

Likewise, by varying the setting (speed) of the unit 545 from time to time we shall also be able to vary the power developed by the several power-motors (while maintaining them in synchronism as to such power), so that varying requirements for power shall be automatically supplied and complied with at all times.

Now the rotative speed of this unit 545 is controlled by the demand for power as dictated by the setting of the handle 428 for free-flight speed (except under certain special conditions), so that by setting the handle 428 for the desired free-flight-speed we shall automatically maintain the power developed by the several power-motors at the amount needed to maintain that speed, and with varying conditions of operation, such as rising and descending of the airplane, changes of altitude, etc., the power developed from time to time will automatically re-adjust itself to maintain that pre-set speed of flight, until the setting of the handle 428 is altered, or until manual control intervenes, or some other special condition is applied. To accomplish the foregoing results the following arrangements have been provided:

The rheostat 547 for the field control of the shunt motor 548 of the unit 545 is controlled by the small reversible motor 549, through the worm gear and rack and pinion arrangement 550. This small motor 549 has the two fields 551 and 552 which may be alternately used in series with the motor armature, to enable reversal of said armature in well understood manner. These fields 551 and 552 are connected to the contacts 513 and 514 of the unit 508, so that as the actual free-flight speed of the airplane either exceeds or is less than the indicated speed-setting of the handle 428 the frequency of the motor generator unit 545 will be raised or lowered as the case may be, to thereby correspondingly adjust the powers being delivered by the several power-motors by throttle control thereof, and under synchronism of such powers. In other words, although the handle 428 is set to a given free-flight-speed, still the result thereof is to adjust and control powers developed by the several power-motors to meet the demand for power as found by the controls, in order to maintain that speed of free-flight.

During the foregoing adjustments of power as dictated by the setting of the handle 428 and the instaneous actual free-flight-speed conditions, as found by the unit 492 in comparison to the setting of the handle 427 (for power-motor rotative speed), the rotative speeds of the several power-motors will be maintained in synchronism and control by the several units 535 in comparison to the frequency delivered by the unit 433 over the lines 539, and by use of the polyphase units 527–527ᵃ in the respective propeller hubs, all as heretofore explained. Thus speeds of rotation of the several propellers and power-motors will be controlled automatically while powers are adjusted from time to time to maintain free-flight-speed constant at the setting of the handle 428.

Now manifestly with this arrangement the varying demands for power needed to maintain desired free-flight conditions will be met by adjustments of the blade pitches, since speeds are being maintained constant under setting of the handle 427. This condition, however, has limitations, since increasing demand for power due to some condition of flight, in order to maintain free-flight-speed, must be met by increased pitches of the blades. It is well known that increase of pitch (angle of attack) results in increased traction or pull up to a certain "critical" angle, after which further increase of such pitch angle results in rapid decrease of traction or pull. Manifestly, therefore, increased power demands (at given rotative speed) can be met only up to a certain point by increase of pitch, after which any further increase in demanded power can be met only by increase of rotative speed, without further increase in pitch.

In operation usually the handle 427 will be set for that rotative speed of the power-motors which is proper for take-off and the free-flight conditions requiring rotative speed comparable to the rotative speed used during take-off. Any higher rotative speeds of the motors, required during flight will have to be met either by manual re-setting of the handle 427 or by some form of automatic control related to the controls so far disclosed herein. In the type of blade shifting device herein referred to as being contained within the propeller hub, and which is operated by the rotor 527ᵃ working in reaction to the stator 527, there is usually provided a segmental gear 553 which is turned for blade pitch changes by the rotor 527ᵃ through a large gear reduction, so that a fraction of one complete rotation of such segmental gear will result in complete setting of the blades from one extreme of pitch to the other. As a simple means of securing supplemental rotative speed control for the power-motors to meet conditions imposed when high pitches or angles of blades have been met, I have shown the contact 554 carried by each of these segmental gears 553, and swinging back and forth with changes of blade pitch. I have also shown the contacts 555 and 556 at the two sides of said swinging contact 554, so that as said contact 554 moves back and forth it will engage either of the contacts 555 or 556 as the case may be, at the corresponding limit of swing of the companion segmental contact carrier 553. Thus, if increase of pitch should be indicated by clock-wise rotation of the segmental gear 553, when the pitch reaches a certain high value, the contact 554 will engage the contact 555, whereas when the pitch reaches a certain low value the contact 554 will engage the contact 556, having previously disengaged from the contact 555. Normally the clearance between the contacts 555 and 556 is such that normal adjustments of pitch under control of the unit 527–527ᵃ will not result in engagement of the contact 554 with either of the contacts 555 or 556, so that normally the speed adjustments are effected entirely by the reactions between the elements 527 and 527ᵃ, and are of relatively small amount, merely to maintain synchronism, or to maintain free-flight-speed at the pre-set value as shown by the setting of the handle 427.

There is provided the small reversible series motor 557 for the unit 433, same including the field coils 558 and 559 of opposite winding, so that by exciting either one of these coils the direction of motor rotation is controlled. This motor 557 acts on the contact carrier 560 for the rheostat 561 of the unit 433 in manner similar to the motor 444 of FIGURE 18 of said Letters Patent No. 2,794,507. That is to say, when the contact carrier has been set to any given setting by the handle 427 (for rotative speed), by excitation of either one or the other of the field coils 558 or 559 the setting of the contact carrier may be increased to that for a higher rotative speed, without change of handle setting, and thereafter the contact carrier be again reset to the position of the handle setting, all due to the frictional drive between the worm gear reduction of the motor 557 and the rack bar of the contact carrier itself, as more fully disclosed in the said Letters Patent No. 2,794,507.

I provide a direct current line 562 leading to the several contact elements 554; and I also provide the lines 563 and 564 leading from the contacts 555 and 556 respectively to the terminals of the field coils 558 and 559. Thus, whenever any one of the blade pitch controls reaches the high pitch position of its contact 555 the field coil 558 of the motor 557 will be energized, causing the rheostat 561 to be cut in to a higher resistance and causing increase of frequency delivered by the unit 433, and over the lines 539 to the several blade pitch control devices, and resulting in increase of power-motor speed. This will result in finally re-setting the pitches of the propellers back to a slightly lower angle, so that the contacts 554 will be drawn away from the contacts 555 and further resetting of the speed of the unit 433 will cease. Then the power-motor speed, and the speeds of the propellers will be retained at the new setting, higher than the indication of the handle 427, until a further time. Likewise movement of the contacts 554 in counter-clockwise direction will result in re-setting of the speed of the unit 433 to a lower value, until finally it is re-set at the value indicated by the setting of the handle 427.

It is noted that with very high velocities of free-flight, as of 400 or 500 or even 600 miles per hour, the velocity of the setting of the handle 427 for take-off will generally be considerably less than that desired for such free-flight speeds, but this condition will be fully taken care of by the provision of the segmental rotative speed control just above explained.

It should also be noted that if desired an interconnection might be provided between the two control handles 427 and 428, similar to those illustrated in FIGURES 12, 13 and 14, of said Letters Patent No. 2,794,507, so that settings of the handle 428 for high velocities of free-flight would be automatically accomplished by proper settings of the handle 427 for corresponding rotational rates of the power-motors, thereby avoiding the necessity of automatic control of the resetting of the unit 433 as just above explained.

It is also here noted that if desired the contacts 555 of the embodiment shown in FIGURE 3 might be made angularly adjustable so that the actual blade angle at which said contacts should become effective could be adjusted. Thus, with increase of free-flight velocity said contacts could be set to higher angle positions, since, manifestly, with increase of velocity of free-flight the actual blade angles should be increased in order to maintain the desired angle of attack. For example, when operating at 500 miles per hour free-flight velocity the actual angle should be greater (for a given angle of attack), and for development of a desired reaction against the air, than for a condition of 400 miles per hour. Still the momentary adjustments of pitch should be effected close to this greater actual angle than at the lower velocities of free-flight, in order to maintain control of engine speed at the new rotational rate, and to maintain synchronism at the new rotational rate. In other words, the unit 527–527ª would then function within a close range of adjustments at this greater angle setting.

In the arrangement shown in FIGURE 4 the unit 545 serves to control and synchronize the power-motors for speed by throttle control instead of by blade pitch control as in the embodiment shown in FIGURE 3. This throttle control is made over the lines 546, and according to the disclosures of FIGURES 1, 17 and 19 of my previously mentioned Letters Patent of the United States No. 2,612,956. In the present embodiment the handle 428 serves to control the unit 457 which determines the free-flight velocity, working through the differential 508; but in the present case this differential controls the reversible motor 548 for control of the propeller blade-pitches as a group or gang. This is done by the control of the pressure reducing valve 659, of the type shown in FIGURES 6 and 7 of my aforesaid Letters Patent No. 2,794,507; and the blade shifting devices 660 are of the type shown in FIGURES 3, 4 and 5 of said Letters Patent, or other suitable type. It is noted that with this arrangement the synchronization of the power-motors for speed is effected by throttle control thereof.

In both of FIGURES 3 and 4 of this case the unit 545 is used for throttle control but, as disclosed in my aforesaid Letters Patent No. 2,794,507 other arrangements embodying the econometer unit and which arrangements effect the controls by blade-pitch may be used. I do not intend to limit myself to throttle controls except as I may do so in the claims to follow.

In the foregoing disclosures it will be seen that in an operation wherein a power producing medium is used to produce a function which varies from time to time, and wherein the production of said function is dependent on at least one variable which is controllable as to its amount, and wherein the ratio at any given time between the amount of such function which is produced, as compared to the amount of such power producing medium depends on the value of such controllable variable, and wherein said ratio under such conditions has a maximum value for a given value of the controllable variable, I have provided means to automatically change the value of the controllable variable from time to time, so that said ratio is brought substantially to such maximum amount by such automatic change is made. It will also be seen that I have provided such automatic means which may function in substantially continuous manner to effect changes in the value of the controllable variable in substantially continuous manner, or periodically at regularly time intervals. It will also be seen that specifically I have provided means to effect changes in such controllable variable wherein the power producing medium comprises fuel which is consumed, and wherein the amount of the function which is produced may be either at a substantially constant rate or at a variable rate. Other specific features will also be apparent from study of said disclosures.

Continuing the above analysis, in the above statement the "power producing medium" is the fuel, the "function produced" is the air speed, the element "at least one variable" in the embodiments shown in the drawings is either the motor throttle or the blade-pitch, the "amount of such function" is the value of the air speed or other power consuming rate in m.p.h. or other selected units of speed, and the "amount of such power producing medium" is the rate of fuel feed. Specifically, in FIGURE 3 the element "at least one variable" is the control effected by the motor throttle, and in FIGURE 4 it is the propeller blade pitch. It is evident, however, that when using the econometer feature of the present invention the operation might be other than production of power, and that the variable might be other than a motor throttle or a blade pitch control, that the power producing medium might be other than fuel, that the function produced might be other than air speed, and the amount thereof might be other than m.p.h. or other suitable units, and that the amount of power producing medium might be other than the rate of fuel feed. There are various industrial uses and operations wherein the functions and the variables and the end products or results are such that the devices embodying my present invention might be usefully applied.

It is also noted that the motor 557 is in effect a "servo-motor" acting under proper control to effect the changes or controls which are desired in the operations of the element to which such servo-motor is drivingly connected, but that in some cases a servo-motor as a special element might be found unnecessary, the operations which it produces in the embodiments herein illustrated being then performed by other means or elements.

It is also evident that in its broader aspects the present invention does not require the use of a ratio determining device such as illustrated in FIGURE 2 which acts to subtract logarithms of functional values from each other, but instead there might be substituted any other suitable form of ratio determining device to compare the "amount of such function produced" with the "amount of such power producing medium," or equivalent functions or values or amounts. Accordingly, I do not intend to limit myself except as I may do so in the claims to follow.

For clarity of understanding of the sequence of the signals and operations produced by the specific embodiments shown in FIGURES 3 and 4, I have also included the "Flow Sheets" shown in FIGURES 5 and 6, corresponding to said FIGURES 3 and 4, respectively. These FIGURES 5 and 6 carry numerals and legends corresponding to those of FIGURES 3 and 4, so that it is not deemed necessary to describe such FIGURES 5 and 6 in full detail. It is, however, noted that in each case, being the throttle control shown in FIGURES 3 and 4, and in FIGURES 5 and 6, and the propeller pitch controls shown in said figures, are brought into the arrangements in such manner that "runaway" conditions cannot occur. Thus, in FIGURE 3 the econometer controls the propeller pitch, with throttle control by the differential of manually pre-set flight-speed compared to the actual air-flight speed, whereas in FIGURE 4 the econometer controls the throttle, with propeller pitch control by the differential between manually pre-set flight-speed and the actual air-flight speed. But in each case the operation of the Econometer is based on the ratio between rate of flight and rate of fuel consumption. This is made clear by the flow-sheets of FIGURES 5 and 6.

I claim:

1. Means to generate and transform and deliver power to perform a function and to control the economy of such power transformation and delivery, comprising in combination a fuel consuming prime mover unit, means to control the rate of fuel input to said unit, means to transform and deliver the power from said prime mover unit and to perform said power delivery function at a determined rate of delivery, the rate of fuel input control means comprising a first power control means and the means to transform and deliver the power from the prime mover unit comprising a second power control means, means to produce a first frequency at rate proportional to the rate of delivery of the function, means to produce a second frequency at rate proportional to the rate of fuel input to the fuel consuming prime mover unit, ratio determining means to compare the values of the first and second frequencies, operative connections between the first frequency producing means and the ratio determining means, and operative connections between the second frequency producing means and the ratio determining means, said ratio determining means including a ratio indicating element movable in a first defined direction corresponding to increasing ratio values and movable in a second defined direction corresponding to decreasing ratio values, a reversible servo-motor unit, operative connections between the servo-motor unit and the power control means first defined effective to actuate said first defined power control means for increase or decrease of the rate controlled by said first defined power control means according to direction of movement of said servo-motor unit, and operative connections between the ratio indicating element of the ratio determining means and said servo-motor unit, said operative connections between the ratio indicating element of the ratio determining means and the power control means first defined, including means constituted to cause the servo-motor unit to function in direction to actuate the said first defined power control means for change of the ratio determined by said power control means to produce movement of the ratio indicating element in the increasing ratio indicating direction.

2. Means as defined in claim 1, wherein the operative connections from the servo-motor unit are to the first defined power control means.

3. Means as defined in claim 1, wherein the operative connections from the servo-motor unit are to the second defined power control means.

4. Means as defined in claim 1, wherein the ratio indicating element movement changes from the first defined direction to the second defined direction corresponding to some position of the first defined power control means wherein the operative connections between the ratio indicating element of the ratio determining means and said servo-motor unit include means to discontinue functioning of the servo-motor unit when the ratio indicating element movement changes direction from said first defined direction to said second defined direction.

5. Means as defined in claim 4, wherein the operative connections between the ratio indicating element of the ratio determining means and said servo-motor unit also include means to cause the servo-motor unit to function when the ratio indicating element moves in said second defined direction.

6. Means as defined in claim 5, wherein the operative connections between the ratio indicating element of the ratio determining means and said servo-motor unit also include servo-motor reversing means, and wherein said connections also include servo-motor reverser actuating means and include means to cause said reverser actuating means to function when the ratio indicating element of the ratio determining means moves in said second defined direction more than a pre-determined minimal amount.

7. Means as defined in claim 1, together with a continuously operating timer unit, and operative connections between said timer unit and the servo-motor effective to deliver sustained timed impulses to the servo-motor unit including means to actuate said servo-motor unit a pre-determined time interval corresponding to each sustained impulse.

8. Means to generate and transform and deliver power to perform a function and to control the economy of such power transformation and delivery, comprising in combination a fuel consuming prime mover unit, means to control the rate of fuel input to said unit, means to transform and deliver the power from said prime mover unit to perform said function, the control means for the rate of fuel input comprising a first power control means, and the means to transform and deliver the power from the prime mover unit comprising a second power control means, first response means constituted to produce a measurable first response effect of value proportional to the rate of delivery of the function, second response means constituted to produce a second measurable response effect of value proportional to the rate of fuel input to the fuel consuming prime mover unit, ratio determining means to compare the values of the first and second measurable response effects, operative connections between the first response means and the ratio determining means, operative connections between said second response means and the ratio determining means, the value of said ratio varying as the power controlled by one of the power control means changes, and the first derivative of said ratio including a change between positive and negative incremental values at some value of the power controlled by said power control means, said ratio determining means including a ratio indicating element movable in a first defined direction corresponding to increasing ratio values and movable in a second defined direction corresponding to decreasing ratio values, and operative means connecting the ratio indicating element with that power control means whose change causes variation of the value of the ratio, constituted to cause said power control means to effect its control in direction to cause the ratio indicated by the ratio indicating means to increase, and to discontinue the change of said last named power control means when the incremental value of the first derivative of the ratio changes sign between a negative and a positive quantity.

9. Means as defined in claim 8, wherein the power control means whose change causes variation of the value of the ratio, comprises the means to control the rate of fuel input to the fuel consuming prime mover unit.

10. Means as defined in claim 8, wherein the power control means whose change causes variation of the value of the ratio, comprises the means to transform and deliver the power from the prime mover unit to perform the function.

No references cited.

ISADOR WEIL, *Primary Examiner.*

CLARENCE R. GORDON, *Examiner.*